US012775171B2

(12) United States Patent
Sell et al.

(10) Patent No.: US 12,775,171 B2
(45) Date of Patent: Oct. 27, 2026

(54) LARGE-FIELD-OF-VIEW SINGLE-SHEET WAVEGUIDE COMBINERS

(71) Applicant: Applied Materials, Inc., Santa Clara, CA (US)

(72) Inventors: David Alexander Sell, Santa Clara, CA (US); Evan Wang, Palo Alto, CA (US); Simon Lorenzo, Santa Clara, CA (US); Kevin Messer, Mountain View, CA (US)

(73) Assignee: Applied Materials, Inc., Santa Clara, CA (US)

( * ) Notice: Subject to any disclaimer, the term of this patent is extended or adjusted under 35 U.S.C. 154(b) by 356 days.

(21) Appl. No.: 18/593,292

(22) Filed: Mar. 1, 2024

(65) Prior Publication Data

US 2024/0418992 A1 Dec. 19, 2024

Related U.S. Application Data

(60) Provisional application No. 63/521,034, filed on Jun. 14, 2023.

(51) Int. Cl.
*G02B 6/34* (2006.01)
*G02B 27/01* (2006.01)

(52) U.S. Cl.
CPC ........... *G02B 27/0172* (2013.01); *G02B 6/34* (2013.01); *G02B 2027/0112* (2013.01)

(58) Field of Classification Search
CPC .................. G02B 6/34; G02B 27/0172; G02B 2027/0112
See application file for complete search history.

(56) References Cited

U.S. PATENT DOCUMENTS

| | | | | |
|---|---|---|---|---|
| 9,939,647 | B2 * | 4/2018 | Vallius | G02B 27/0081 |
| 10,394,030 | B2 * | 8/2019 | Schowengerdt | G02B 27/0172 |
| 10,725,291 | B2 * | 7/2020 | Chi | G02B 6/0035 |
| 11,067,811 | B2 * | 7/2021 | Chi | G02B 27/0081 |
| 11,137,602 | B2 * | 10/2021 | Vallius | G02B 27/4205 |
| 11,169,379 | B2 * | 11/2021 | Chi | G02B 27/0172 |

(Continued)

FOREIGN PATENT DOCUMENTS

| | | |
|---|---|---|
| CN | 114839779 A | 8/2022 |
| EP | 3995737 A1 | 5/2022 |

OTHER PUBLICATIONS

International Search Report/ Written Opinion issued to PCT/US2024/033992 on Oct. 4, 2024.

*Primary Examiner* — Ryan A Lepisto
(74) *Attorney, Agent, or Firm* — Patterson + Sheridan, LLP

(57) ABSTRACT

Single-sheet waveguide combiners having increased field-of-view for multiple colors by enabling separate action on different colors without creating spurious paths are provided. A waveguide includes a first region including an in-coupler (IC) grating for a first color; a second region including an IC grating for a second color and a third color; a third region including an out-coupler (OC) grating for the first color and an eye-pupil-expander (EPE) grating for the second color and the third color; a fourth region including an EPE grating for the first color; and a fifth region including an OC grating for the second color and the third color and an EPE grating for the first color, wherein the fifth region at least partially overlaps with the third region.

18 Claims, 5 Drawing Sheets

(56) References Cited

U.S. PATENT DOCUMENTS

| | | | | |
|---|---|---|---|---|
| 11,789,261 | B2 * | 10/2023 | Levola | G02B 30/20 359/630 |
| 2018/0284460 | A1 | 10/2018 | Cheng et al. | |
| 2020/0081246 | A1 | 3/2020 | Olkkonen et al. | |
| 2021/0364788 | A1 | 11/2021 | Olkkonen | |
| 2022/0283377 | A1 * | 9/2022 | Popovich | G02B 27/0103 |
| 2023/0236415 | A1 * | 7/2023 | Yang | G02B 5/1842 359/630 |
| 2024/0361592 | A1 * | 10/2024 | Shramkova | G02B 5/1814 |
| 2025/0020922 | A1 * | 1/2025 | Kaech | G02B 27/0103 |
| 2025/0076649 | A1 * | 3/2025 | Lao | G02B 27/0172 |
| 2025/0147318 | A1 * | 5/2025 | Khandekar | G02B 27/4272 |
| 2025/0172756 | A1 * | 5/2025 | Li | G02B 27/0081 |
| 2025/0199313 | A1 * | 6/2025 | Erdmanis | G02B 27/0172 |
| 2025/0306361 | A1 * | 10/2025 | Adema | G02B 27/0081 |
| 2025/0355251 | A1 * | 11/2025 | Potnis | G02B 27/0081 |

* cited by examiner

300

320

360

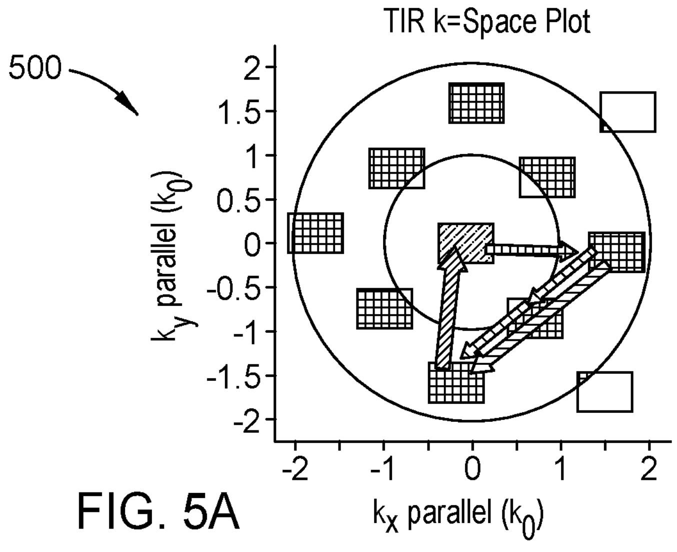
FIG. 5A
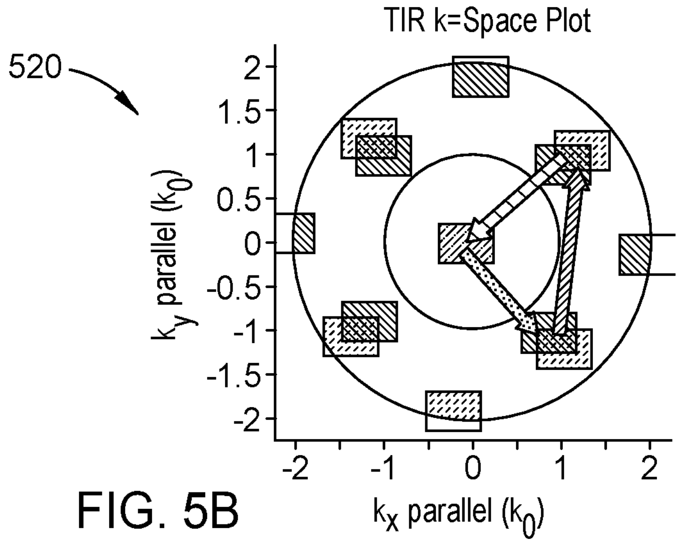
FIG. 5B
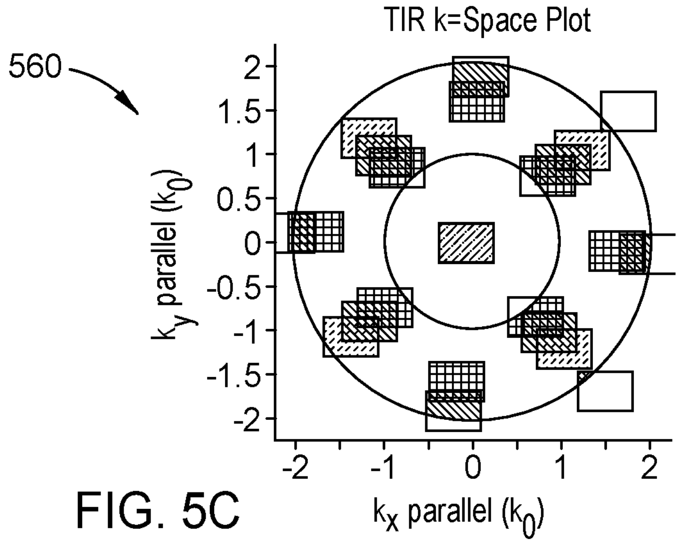
FIG. 5C
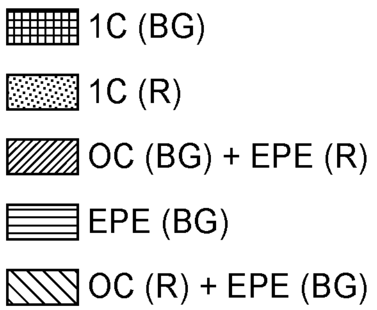

LARGE-FIELD-OF-VIEW SINGLE-SHEET WAVEGUIDE COMBINERS

CROSS-REFERENCE TO RELATED APPLICATIONS

This application claims priority to U.S. Provisional Patent Application No. 63/521,034, filed Jun. 14, 2023, the entirety of which is herein incorporated by reference.

BACKGROUND

Field

Embodiments of the present disclosure generally relate to waveguide combiners. More specifically, embodiments described herein provide for single-sheet waveguide combiners having increased field-of-view for multiple colors.

Description of the Related Art

Virtual reality is generally considered to be a computer generated simulated environment in which a user has an apparent physical presence. A virtual reality experience can be generated in 3D and viewed with a head-mounted display (HMD), such as glasses or other wearable display devices that have near-eye display panels as lenses that display a virtual reality environment that replaces an actual environment.

Augmented reality enables an experience in which a user can see through the display lenses of the glasses or other HMD device to view the surrounding environment while also seeing images of virtual objects that are generated for display and appear as part of the environment. Diffractive waveguide combiners are used in some augmented reality applications to transmit virtual images, graphics, and video that enhance or augment the environment that the user experiences.

In diffractive waveguide combiners, field-of-view (FOV) in one sheet of glass is limited by the ability to fit all colors and all angles into total internal reflection (TIR) within the substrate. There is a limited extent to which typical grating layouts can increase FOV without creating spurious paths that can cause ghost images to be presented to a user. Generally, the only ways to do so are to either increase the refractive index of the substrate (thus allowing more room in TIR), or to use multiple sheets of glass and not put all colors in one sheet. It is therefore desirable to develop single-sheet waveguide combiners having increased FOV for multiple colors.

SUMMARY

In an embodiment, a waveguide is provided. The waveguide includes a first region, a second region, a third region, a fourth region, and a fifth region. The first region includes an in-coupler (IC) grating for a first color. The second region includes an IC grating for a second color and a third color. The third region includes an out-coupler (OC) grating for the first color and an eye-pupil-expander (EPE) grating for the second color and the third color. The fourth region includes an EPE grating for the first color. The fifth region includes an OC grating for the second color and the third color and an EPE grating for the first color. The fifth region at least partially overlaps with the third region.

In an embodiment, a waveguide is provided. The waveguide includes a first region, a second region, a third region, a fourth region, and a fifth region. The first region includes an in-coupler (IC) grating for a first color. The second region includes an IC grating for a second color and a third color. The third region includes an out-coupler (OC) grating for the first color and an eye-pupil-expander (EPE) grating for the second color and the third color. The fourth region includes an EPE grating for the second color and the third color. The fifth region includes an OC grating for the second color and the third color and an EPE grating for the first color. The fifth region at least partially overlaps with the third region.

In an embodiment, a waveguide is provided. The waveguide includes a first region, a second region, a third region, a fourth region, and a fifth region. The first region includes an in-coupler (IC) grating for a first color. The second region includes an IC grating for a second color. The third region includes an out-coupler (OC) grating for the first color and an eye-pupil-expander (EPE) grating for the second color and a third color. The fourth region includes an EPE grating for the first color. The fifth region includes an OC grating for the second color and the third color and an EPE grating for the first color. The fifth region at least partially overlaps with the third region.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIGS. 5A-5C show TIR k-space plots of a waveguide substrate having the arrangement of gratings shown in FIGS. 4A-4C.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure relate to single-sheet waveguide combiners (also referred to herein as "waveguides") having increased field-of-view for multiple colors by enabling separate action on different colors without creating spurious paths.

In diffractive waveguide combiners, field-of-view (FOV) in one sheet of glass is limited by the ability to fit all colors and all angles into total internal reflection (TIR) within the substrate. Increasing FOV with typical grating layouts can create spurious paths within the waveguide combiner that can cause ghost images to be presented to a user. Increasing the refractive index of the substrate (thus allowing more room in TIR) may not be practical, as higher refractive index materials may be too expensive for use in the waveguide combiners. Using multiple sheets of glass and putting some colors in each of the sheets increases the expense of manufacturing the waveguide combiners.

Aspects of the present disclosure provide a layout (e.g., an arrangement) of gratings that allows red light to use a different set of fundamental grating vectors from blue and green light without introducing ghost images within the displayed FOV. Aspects of the present disclosure provide another layout (e.g., an arrangement) of gratings that allows blue light to use a different set of fundamental grating vectors from red and green light without introducing ghost images within the displayed FOV.

The present disclosure may provide single-sheet waveguide combiners having increased FOV for multiple colors. The provided single-sheet waveguide combiners may have expanded FOV while being simpler and/or less expensive to manufacture than typical waveguide combiners.

Aspects of the present disclosure enable an FOV of a single-sheet waveguide to approach the possible FOV of a 2-sheet waveguide. In a 2-sheet waveguide, the FOV can be expanded because one of the sheets supports a combination of two colors, and the other sheet supports a third color. For example, a first sheet may support blue and green light (BG), and a second sheet may support red light (R). In another example, a first sheet may support a combination of green and red light (GR), and a second sheet may support blue light (B). Because the range of wavelengths inside each sheet of the waveguide is reduced, the number of angles that can be supported in total-internal-reflection (TIR) is increased.

In previously known single-sheet waveguides, creating a set of gratings that acts separately on different channels is impractical. In all such cases, all channels of light will interact with the same gratings, and so scaling the pitches of the gratings to account for dispersion (as is done in multi-sheet waveguides) leads to ghost images appearing and being seen by the user.

Figure 1:
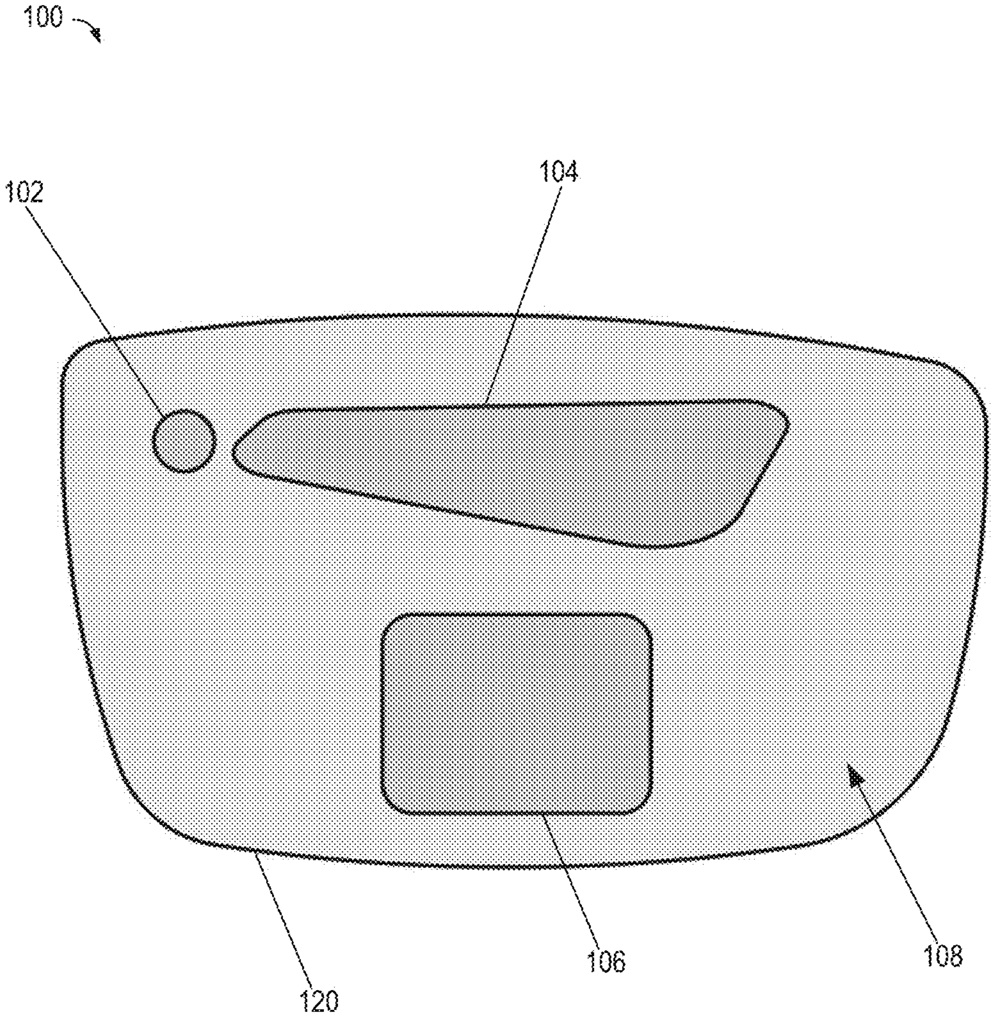
FIG. 1 is a schematic top view of a waveguide combiner according to embodiments described herein.

FIG. 1 is a schematic top view of a waveguide combiner 100 according to embodiments described herein. It is to be understood that the waveguide combiner 100 described below is an exemplary waveguide combiner. The waveguide combiner 100 includes at least one of an in-coupler (IC) grating 102, an eye-pupil-expander (EPE) grating 104, an out-coupler (OC) grating 106, and a waveguide substrate 108. The waveguide substrate 108 has an edge 120. The in-coupler grating 102 receives incident beams of light (a virtual image) from a microdisplay and directs the beams of light into the waveguide substrate 108. The incident beams of light undergo total-internal-reflection (TIR) and propagate in the waveguide combiner 100. The IC grating 102 directs many of the beams of light in the direction of the EPE grating 104 in order to direct the virtual image to the EPE grating 104. The incident beams of light continue under TIR and propagate in the waveguide combiner 100. The EPE grating 104 directs many of the beams of light in the direction of the OC grating 106 in order to direct the virtual image to the OC grating 106. The OC grating out-couples the beams of light to the user in order to present the virtual image to the user. As the incident beams of light propagate in TIR in the waveguide combiner 100, some of the beams of light will be incident on the in-coupler grating 102, the pupil expander grating 104, and the out-coupler grating 106, while some of the beams of light will be incident on other areas of the waveguide substrate 108.

According to aspects of the present disclosure, advantages of multi-sheet gratings are enabled in a single sheet by specifically choosing grating vectors that do not produce ghost paths within the FOV when either channel interacts with them. In embodiments of the present disclosure, each non-in coupler (non-IC) grating has an associated function for both channels of light obtained from IC gratings (e.g., both of a B channel and a GR channel). The grating functions of the non-IC gratings cause a grating vector of each eye-pupil-expander (EPE) for a channel including a first set of colors (e.g., a set of red and green or a set of blue and green) to be either one-half of or double the grating vector of the out coupler (OC) for the channel including the color (e.g., blue or red) that is not in the first set of colors.

Figure 2A:
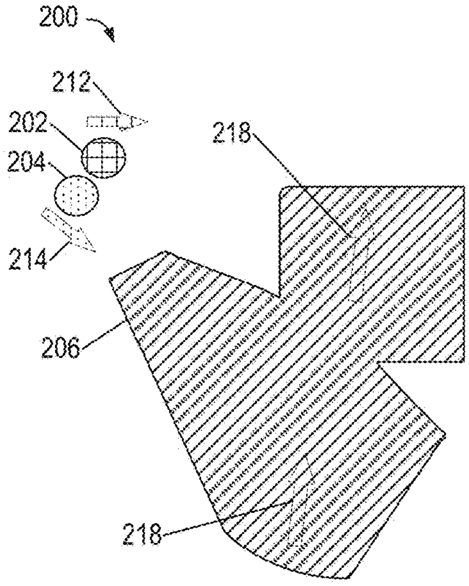
FIGS. 2A-2B are arrangements of gratings on two sides of a waveguide substrate, according to embodiments described herein.
Figure 2B:
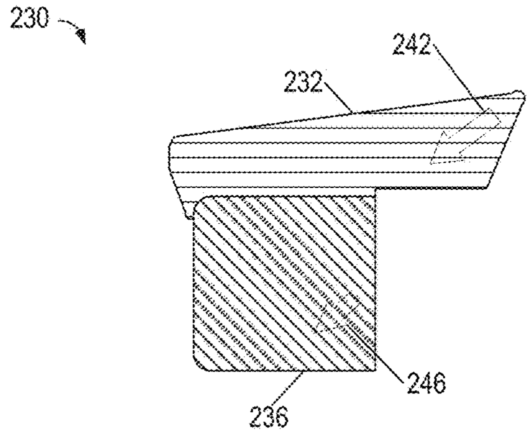

FIGS. 2A-2B are arrangements of gratings on two sides 200 and 230 (e.g., a front side and a back side) of a waveguide substrate 108, according to embodiments described herein. Side 200 includes an in-coupler for blue and green light (IC(BG)) 202, an in-coupler for red light (IC(R)) 204, and a combination out-coupler for blue and green light and eye-pupil-expander for red light (OC(BG)+EPE(R)) 206. Blue light and green light of a virtual image, from a microdisplay, are directed into the IC(BG) 202 and directed by the IC(BG) 202 in direction 212. Red light of the virtual image, from the microdisplay or another microdisplay, is directed into the IC(R) 204 and directed by the IC(R) 204 in direction 214. Some of the red light from the IC(R) 204 interacts with the OC(BG)+EPE(R) 206 and undergoes pupil expansion in the direction 218.

Side 230 includes an EPE for blue and green light (EPE(BG)) 232 and a combination out-coupler for red light and eye-pupil-expander for blue light and green light (OC(R)+EPE(BG)) 236. Some of the blue light and green light from the IC(BG) 202 (see FIG. 2A) interacts with the EPE(BG) 232 and undergoes pupil expansion in the direction 242. Some of the blue light and green light from the IC(BG) 202 (see FIG. 2A) interacts with the OC(R)+EPE(BG) 236 and undergoes pupil expansion in the direction 246, which is substantially parallel to the direction 242. Some of the red light that underwent pupil expansion in direction 218 (see FIG. 2A) interacts with the OC(R)+EPE(BG) 236 and is out-coupled to the user by the OC(R)+EPE(BG) 236. Some of the blue light and green light that underwent pupil expansion in directions 242 and 246 interacts with the OC(BG)+EPE(R) 206 (see FIG. 2A) and is out-coupled to the user by the OC(BG)+EPE(R) 206. The red light out-coupled to the user by the OC(R) +EPE(BG) 236 and the blue light and green light out-coupled to the user by the OC(BG)+EPE(R) 206 may combine to present the virtual image to the user.

Figure 2C:
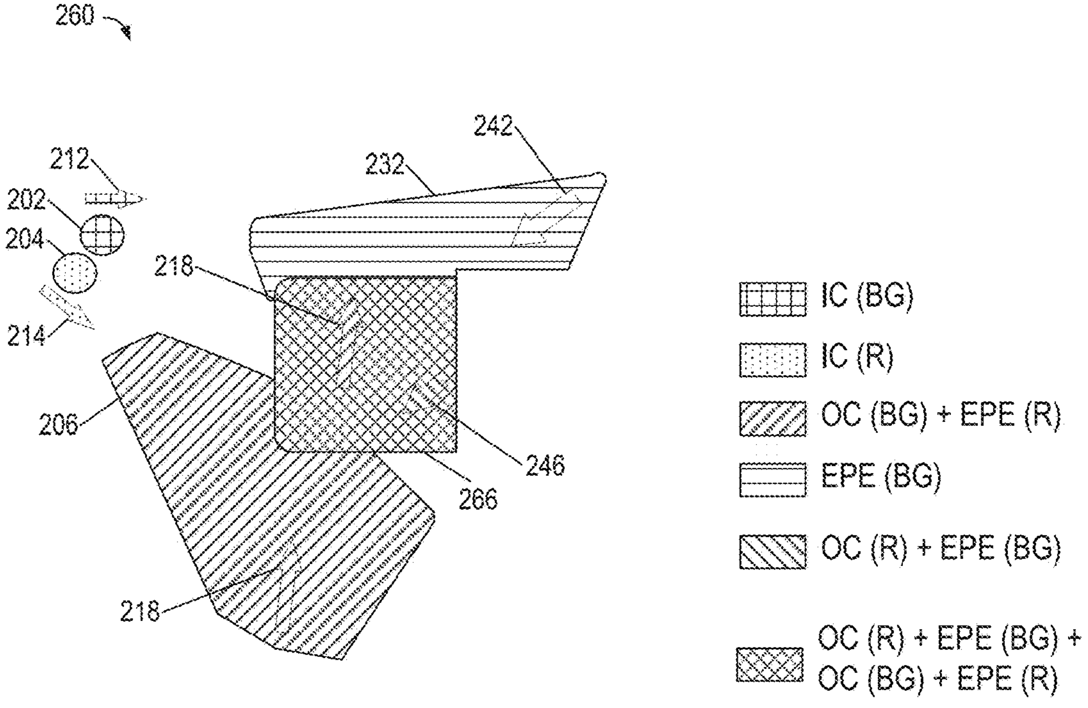
FIG. 2C is an arrangement of the two sides shown in FIGS. 2A-2B as the two sides may be arranged in a waveguide substrate.

FIG. 2C is an arrangement 260 of the two sides 200 and 230 of the waveguide substrate 108 as the two sides may be arranged in the waveguide substrate 108. In the arrangement 260, the region 266 shows the overlapping of the OC(BG)+EPE(R) 206 and the OC(R)+EPE(BG) 236.

While FIGS. 2A-2C depict sets of gratings made on two sides 200 and 230 of a waveguide substrate 108, the present disclosure is not so limited, and the sets of gratings may be implemented on a single side (e.g., side 200) using two-dimensional (2D) gratings in any regions (e.g., region 266) where gratings shown on the sides 200 and 230 in FIGS. 2A and 2B overlap.

In the arrangement 260 of the two sides 200 and 230 shown in FIGS. 2A-2C, the grating functions are:

EPE(BG): Acts as the EPE for blue light and green light while having a grating vector with a length that is exactly double a length of the grating vector of the OC for red light (equivalent to 2nd order diffraction off the red OC);

OC(R)+EPE(BG): Acts as the out-coupler for red light while also having a grating vector (for the red light) with a length that is exactly ½ of a length of a grating vector for the EPE for blue and green light. The extra paths introduced for blue and green light create complex interactions, but any ghost images that result from these interactions are typically at a very large angle and typically will not be within the image FOV.

OC(BG)+EPE(R): The lower-left region of this grating acts as the EPE for red light, and the upper right region of this grating acts as the OC for blue and green light. When blue or green light enters the lower left region, no ghosts are generated, and the blue or green light simply out-couples to the user. When red light interacts with the OC region, the OC region simply acts as additional expansion grating for the red light and also generates no ghost images.

In aspects of the present disclosure, the relationship between grating vectors k of the gratings in the arrangement 260 is represented in equation (1):

$$k_{EPE(BG)} = 2 \cdot k_{OC(R)} \tag{1}$$

where $k_{EPE}$(BG) is the grating vector of the EPE(BG) grating and $k_{OC}$(R) is the grating vector of the OC(R) grating.

In aspects of the present disclosure, the arrangement 260 of the gratings shown in FIGS. 2A-2C may provide a 45 degree FOV (36×27) in a substrate 108 made from materials having a refractive index of 2.0.

Figure 3A:
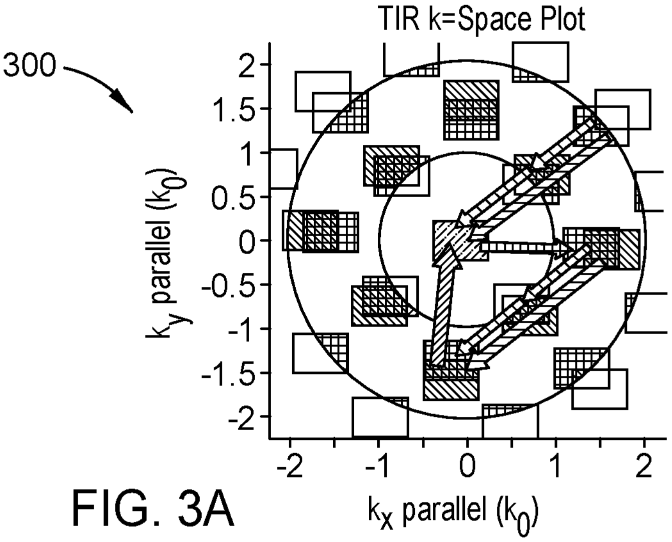
FIGS. 3A-3C show TIR k-space plots of a waveguide substrate having the arrangement of gratings shown in FIGS. 2A-2C.
Figure 3B:
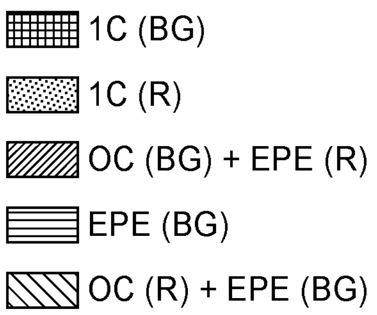
Figure 3B:
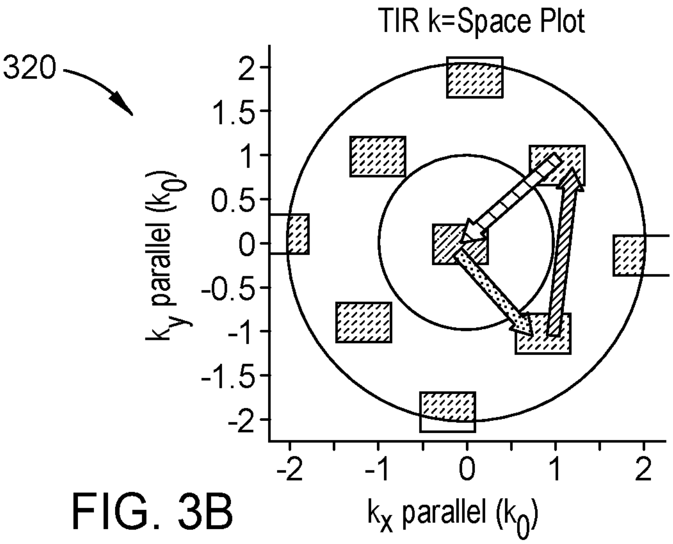
Figure 3C:
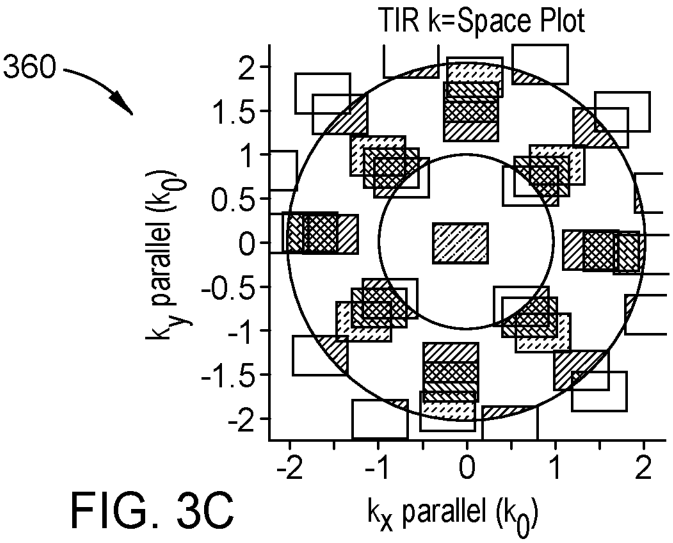

FIGS. 3A-3C show TIR k-space plots of a waveguide substrate having the arrangement of gratings shown in FIGS. 2A-2C. FIG. 3A is a TIR k-space plot 300 of blue and green light with grating vectors. As illustrated, a length of the grating vector 302 of the EPE(BG) (e.g., grating 232 in FIGS. 2B and 2C) is double a length of the grating vector 304 of the OC(R) (e.g., grating 236 in FIGS. 2B and 2C). FIG. 3B is a TIR k-space plot 320 of red light with grating vectors. FIG. 3C is a combination 360 of the k-space plots 300 and 320 with the grating vectors removed.

Figure 4A:
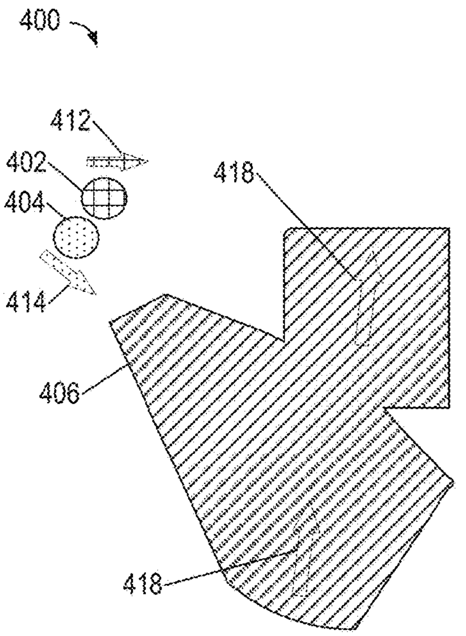
FIGS. 4A-4B are arrangements of gratings on two sides of a waveguide substrate, according to embodiments described herein.
Figure 4B:
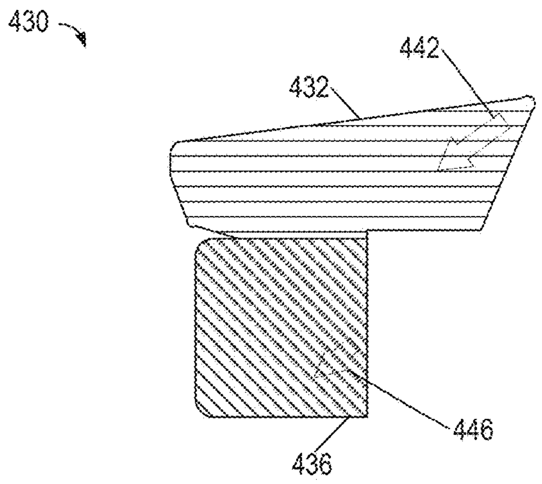

FIGS. 4A-4B are arrangements of gratings on two sides 400 and 430 (e.g., a front side and a back side) of a waveguide substrate 108, according to embodiments described herein. Side 400 includes an in-coupler for blue light (IC(B)) 402, an in-coupler for green and red light (IC(GR)) 404, and a combination out-coupler for blue light and eye-pupil-expander for green and red light (OC(B)+EPE (GR)) 406. Blue light of a virtual image, from a microdisplay, is directed into the IC(B) 402 and directed by the IC(B) 402 in direction 412. Green and red light of the virtual image, from the microdisplay or another microdisplay, is directed into the IC(GR) 404 and directed by the IC(GR) 404 in direction 414. Some of the green and red light from the IC(GR) 404 interacts with the OC(B)+EPE(GR) 406 and undergoes pupil expansion in the direction 418.

Side 430 includes an EPE for blue light (EPE(B)) 432 and a combination out-coupler for green and red light and eye-pupil-expander for blue light (OC(GR)+EPE(B)) 436. Some of the blue light from the IC(B) 402 (see FIG. 4A) interacts with the EPE(B) 432 and undergoes pupil expansion in the direction 442. Some of the blue light from the IC(B) 402 (see FIG. 4A) interacts with the OC(GR)+EPE(B) 436 and undergoes pupil expansion in the direction 446, which is substantially parallel to the direction 442. Some of the green and red light that underwent pupil expansion in direction 418 (see FIG. 4A) interacts with the OC(GR)+EPE(B) 436 and is out-coupled to the user by the OC(GR)+EPE(B) 436. Some of the blue light that underwent pupil expansion in directions 442 and 446 interacts with the OC(B)+EPE(GR) 406 (see FIG. 4A) and is out-coupled to the user by the OC(B)+EPE(GR) 406. The green and red light out-coupled to the user by the OC(GR)+EPE(B) 436 and the blue light out-coupled to the user by the OC(B)+EPE(GR) 406 may combine to present the virtual image to the user.

Figure 4C:
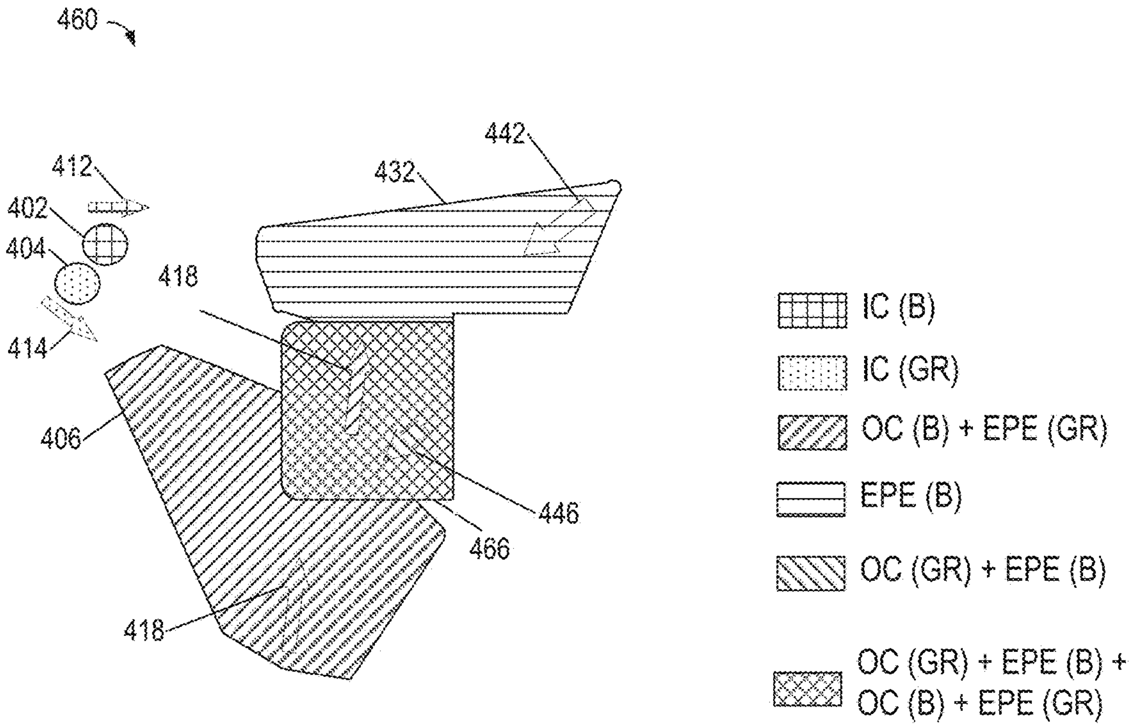
FIG. 4C is an arrangement of the two sides shown in FIGS. 4A-4B as the two sides may be arranged in a waveguide substrate.

FIG. 4C is an arrangement 460 of the two sides 400 and 430 of the waveguide substrate 108 as the two sides may be arranged in the waveguide substrate 108. In the arrangement 460, the region 466 shows the overlapping of the OC(B)+EPE(GR) 406 and the OC(GR)+EPE(B) 436.

While FIGS. 4A-4C depict sets of gratings made on two sides 400 and 430 of a waveguide substrate 108, the present disclosure is not so limited, and the sets of gratings may be implemented on a single side (e.g., side 400) using two-dimensional (2D) gratings in any regions (e.g., region 466) where the gratings shown on the sides 400 and 430 in FIGS. 4A and 4B overlap.

In the arrangement 460 of the two sides 400 and 430 shown in FIGS. 4A-4C, the grating functions are:

EPE(B): Acts as the EPE for blue light while having a grating vector with a length that is exactly double a length of the grating vector of the OC for green and red light (equivalent to 2nd order diffraction off the green and red OC);

OC(GR)+EPE(B): Acts as the out-coupler for green and red light while also having a grating vector (for the green and red light) that is exactly ½ of a length of a grating vector for the EPE for blue light. The extra paths introduced for blue light create complex interactions, but any ghost images that result from these interactions are typically at a very large angle and typically will not be within the image FOV. The effect of those interactions is lessened in the arrangement 460 as compared to the arrangement 260.

OC(B)+EPE(GR): The lower-left region of this grating acts as the EPE for green and red light, and the upper right region of this grating acts as the OC for blue light. When blue light enters the lower left region, no ghosts are generated, and the blue light out-couples to the user. When GR light interacts with the OC region, the OC region acts as additional expansion grating for the green and red light and also generates no ghost images.

In aspects of the present disclosure, the relationship between grating vectors k of the gratings in the arrangement 460 is represented in equation (2):

$$k_{EPE(B)} = 2 \cdot k_{OC(GR)} \tag{2}$$

where $k_{EPE}$(B) is the grating vector of the EPE(B) grating and $k_{OC}$(GR) is the grating vector of the OC(GR) grating.

In aspects of the present disclosure, the arrangement 460 of the gratings shown in FIGS. 4A-4C may provide a 45 degree FOV (36×27) in a substrate 108 made from materials having a refractive index of 2.0.

FIGS. 5A-5C show TIR k-space plots of a waveguide substrate having the arrangement of gratings shown in FIGS. 4A-4C. FIG. 5A is a TIR k-space plot 500 of blue light with grating vectors. As illustrated, a length of the grating vector 502 of the EPE(B) (e.g., grating 432 in FIGS. 4B and 4C) is double a length of the grating vector 504 of the OC(GR) (e.g., grating 436 in FIGS. 4B and 4C). FIG. 5B is a TIR k-space plot 520 of green and red light with grating vectors. FIG. 5C is a combination 560 of the k-space plots 500 and 520 with the grating vectors removed.

While the foregoing is directed to embodiments of the present disclosure, other and further embodiments of the disclosure may be devised without departing from the basic scope thereof, and the scope thereof is determined by the claims that follow.

What is claimed is:

1. A waveguide, comprising:
a first region including an in-coupler (IC) grating for a first color;
a second region including an IC grating for a second color and a third color;
a third region including an out-coupler (OC) grating for the first color and an eye-pupil-expander (EPE) grating for the second color and the third color;
a fourth region including an EPE grating for the first color; and
a fifth region including an OC grating for the second color and the third color and an EPE grating for the first color, wherein the fifth region at least partially overlaps with the third region.

2. The waveguide of claim 1, wherein:
the first color is red;
the second color is green; and
the third color is blue.

3. The waveguide of claim 1, wherein:
the first color is blue;
the second color is green; and
the third color is red.

4. The waveguide of claim 1, wherein:
a length, of a grating vector of the OC grating for the first color in the third region, is one-half as long as a length of a grating vector of the EPE for the second color and the third color in the third region.

5. The waveguide of claim 1, wherein:
a length, of a grating vector of the OC grating for the second color and the third color in the fifth region, is one-half as long as a length of a grating vector of the EPE for the first color in the fifth region.

6. The waveguide of claim 1, wherein:
the IC grating for the first color, the IC grating for the second color and the third color, the OC grating for the first color, and the EPE grating for the second color and the third color are on a first side of the optical waveguide substrate;
the EPE grating for the first color and the OC grating for the second color and the third color are on a second side of the waveguide.

7. A waveguide, comprising:
a first region including an in-coupler (IC) grating for a first color;
a second region including an IC grating for a second color and a third color;
a third region including an out-coupler (OC) grating for the first color and an eye-pupil-expander (EPE) grating for the second color and the third color;
a fourth region including an EPE grating for the second color and the third color; and
a fifth region including an OC grating for the second color and the third color and an EPE grating for the first color, wherein the fifth region at least partially overlaps with the third region.

8. The waveguide of claim 7, wherein:
the first color is red;
the second color is green; and
the third color is blue.

9. The waveguide of claim 7, wherein:
the first color is blue;
the second color is green; and
the third color is red.

10. The waveguide of claim 7, wherein:
a length, of a grating vector of the OC grating for the first color in the third region, is one-half as long as a length of a grating vector of the EPE for the second color and the third color in the third region.

11. The waveguide of claim 7, wherein:
a length, of a grating vector of the OC grating for the second color and the third color in the fifth region, is one-half as long as a length of a grating vector of the EPE for the first color in the fifth region.

12. The waveguide of claim 7, wherein:
the IC grating for the first color, the IC grating for the second color and the third color, the OC grating for the first color, and the EPE grating for the second color and the third color are on a first side of the waveguide;
the EPE grating for the first color and the OC grating for the second color and the third color are on a second side of the waveguide.

13. A waveguide, comprising:
a first region including an in-coupler (IC) grating for a first color;
a second region including an IC grating for a second color;
a third region including an out-coupler (OC) grating for the first color and an eye-pupil-expander (EPE) grating for the second color and a third color;
a fourth region including an EPE grating for the first color; and
a fifth region including an OC grating for the second color and the third color and an EPE grating for the first color, wherein the fifth region at least partially overlaps with the third region.

14. The waveguide of claim 13, wherein:
the first color is red;
the second color is green; and
the third color is blue.

15. The waveguide of claim 13, wherein:
the first color is blue;
the second color is green; and
the third color is red.

16. The waveguide of claim 13, wherein:
a length, of a grating vector of the OC grating for the first color in the third region, is one-half as long as a length of a grating vector of the EPE for the second color and the third color in the third region.

17. The waveguide of claim 13, wherein:
a length, of a grating vector of the OC grating for the second color and the third color in the fifth region, is one-half as long as a length of a grating vector of the EPE for the first color in the fifth region.

18. The waveguide of claim 13, wherein:

the IC grating for the first color, the IC grating for the second color, the OC grating for the first color, and the EPE grating for the second color and the third color are on a first side of the waveguide;

the EPE grating for the first color and the OC grating for the second color and the third color are on a second side of the waveguide.

* * * * *